US010280789B2

United States Patent
Teia Dos Santos Mendes Gomes

(10) Patent No.: US 10,280,789 B2
(45) Date of Patent: May 7, 2019

(54) PROTECTION SYSTEM AND TURBO ENGINE WITH A PROTECTION SYSTEM

(71) Applicant: Rolls-Royce Deutschland Ltd & Co KG, Blankenfelde-Mahlow (DE)

(72) Inventor: Luis Daniel Teia Dos Santos Mendes Gomes, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 484 days.

(21) Appl. No.: 15/094,234

(22) Filed: Apr. 8, 2016

(65) Prior Publication Data

US 2016/0298487 A1    Oct. 13, 2016

(30) Foreign Application Priority Data

Apr. 10, 2015  (EP) .................................. 15163264

(51) Int. Cl.
 *F02G 3/00* (2006.01)
 *F01D 21/14* (2006.01)
 *F01D 9/06* (2006.01)
 *F01D 21/12* (2006.01)
 *F02C 9/18* (2006.01)
 *F01D 25/12* (2006.01)
 (Continued)

(52) U.S. Cl.
 CPC ............... *F01D 21/14* (2013.01); *F01D 9/06* (2013.01); *F01D 21/12* (2013.01); *F01D 25/12* (2013.01); *F01D 25/14* (2013.01); *F01D 25/26* (2013.01); *F02C 9/18* (2013.01); *F05D 2220/20* (2013.01); *F05D 2220/323* (2013.01); *F05D 2240/14* (2013.01); *F05D 2240/15* (2013.01); *F05D 2250/36* (2013.01); *Y02T 50/671* (2013.01)

(58) Field of Classification Search
 CPC .......... F01D 21/14; F01D 25/12; F01D 25/14; F01D 25/26; F01D 21/12; F01D 9/06; F02C 9/18; F05D 2220/323; F05D 2240/14; F05D 2240/15; F05D 2220/20; F05D 2250/36
 USPC .................. 285/13, 14, 45; 60/39.091, 39.1; 415/116
 See application file for complete search history.

(56) References Cited

U.S. PATENT DOCUMENTS 317,794 A  *  5/1885  Jackson ........................... 285/13
333,413 A  *  12/1885  Hoeveler ......................... 285/13
(Continued)

FOREIGN PATENT DOCUMENTS

EP            1113159 A2      7/2001
WO    WO2014051832 A1      4/2014

OTHER PUBLICATIONS

European Search Report dated Oct. 22, 2015 from EP App No. 15163264.3.

Primary Examiner — Greg Binda
(74) Attorney, Agent, or Firm — Shuttleworth & Ingersoll, PLC; Timothy Klima

(57) ABSTRACT

A protection system for a turbo engine, in particular an aircraft engine is provided. The turbo engine comprises at least one fluid duct element with a casing device comprising at least one casing section, encasing at least partially the at least one fluid duct element, said casing device comprising at least one fluid escaping means, wherein the casing device is intended to at least partially contain and/or deflect a fluid stemming from a burst event at the fluid duct element event in order to at least partially protect the turbo engine.

13 Claims, 6 Drawing Sheets

(51) Int. Cl.
*F01D 25/14* (2006.01)
*F01D 25/26* (2006.01)

(56) References Cited

U.S. PATENT DOCUMENTS

| | | | | |
|---|---|---|---|---|
| 1,497,652 A | * | 6/1924 | Browne | F16L 39/005 |
| | | | | 285/13 |
| 2,705,397 A | * | 4/1955 | Blackman | F02C 7/25 |
| | | | | 60/39.091 |
| 4,683,716 A | | 8/1987 | Wright et al. | |
| 5,048,288 A | | 9/1991 | Bessette et al. | |
| 5,702,129 A | * | 12/1997 | Harrington | E03F 3/04 |
| | | | | 285/45 |

* cited by examiner

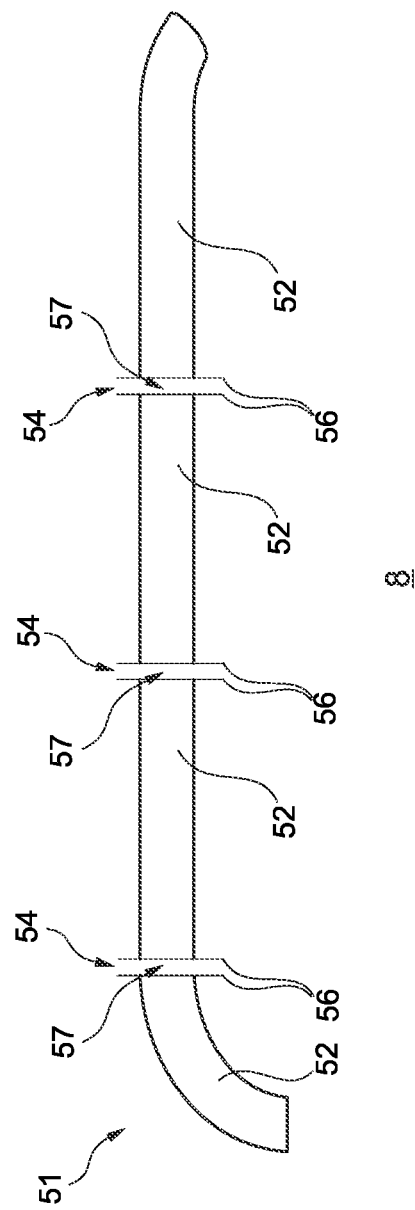

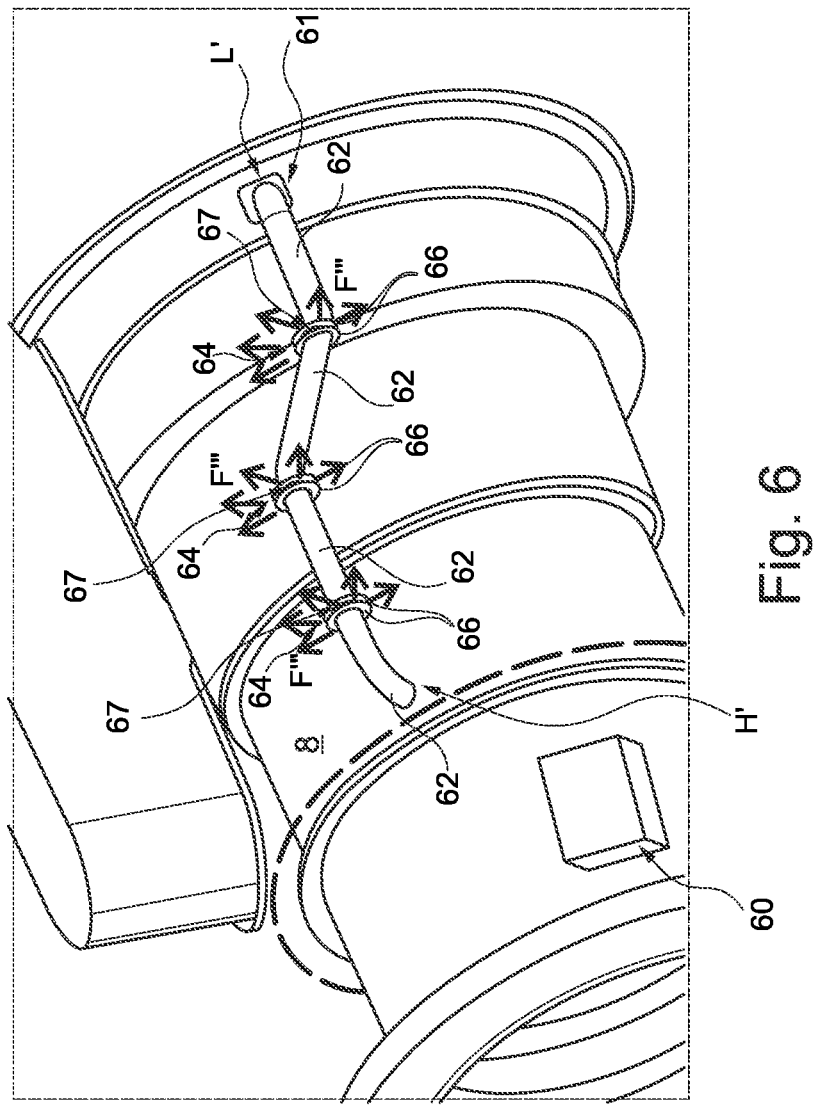

PROTECTION SYSTEM AND TURBO ENGINE WITH A PROTECTION SYSTEM

CROSS-REFERENCE TO RELATED APPLICATION

This application claims priority to European Patent Application No. 15 163 264.3 filed on Apr. 10, 2015, the entirety of which is incorporated by reference herein.

BACKGROUND

The invention is related to a protection system and a turbo engine with a protection system.

Certain regions of turbo engines (e.g. gas turbines or aircraft engines) comprise temperature sensitive devices and/or structures. These temperature sensitive devices and/or structures can have an upper temperature limit until which they are properly operable. If they are heated above this temperature they might be in danger of malfunctioning.

These upper temperature limits are often lower than the temperatures of fluids flowing through fluid duct elements of a turbo engine. If such a fluid duct element bursts, the hot fluid leaking out of the burst fluid duct element can provide a great risk for temperature sensitive devices and/or structures within a turbo engine. In case of such a burst event at the fluid duct element the flow through the fluid duct element might decrease or even completely stop leading to further possible failure risks of components of the turbo engine.

Also such a so called burst event at the fluid duct element might produce debris, providing additional risk to elements surrounding the fluid duct element.

SUMMARY

Therefore an effective protection against the burst event at the fluid duct element, in particular the protection of temperature sensitive devices and/or structures against the hot fluid leaking out is necessary. To partially maintain the original flow through the fluid duct element might be necessary too to prevent other possible failure risks for components of the turbo engine.

The present invention provides a protection system with the features as described herein.

Accordingly the invention comprises a protection system for a turbo engine, in particular an aircraft engine, said turbo engine comprising at least one fluid duct element, with a casing device comprising at least one casing section, encasing at least partially the at least one fluid duct element, said casing device comprising at least one fluid escaping means, wherein the casing device is intended to at least partially contain and/or deflect a fluid stemming from a burst event at the fluid duct element in order to at least partially protect the turbo engine.

The turbo engine can e.g. be an aircraft engine or a gas turbine. One possible type of aircraft engine is a turbofan engine. A turbo engine usually has a longitudinal and radial direction. The longitudinal direction runs from the front to the end of the engine and the radial direction is perpendicular to it.

The fluid duct element might be a cooling pipe. The cooling pipe might be for cooling a core of the turbo engine. The turbo engine might also comprise a temperature sensitive device and/or structure as for example a Handling Bleed Valve Solenoid Block (HBVSB). The fluid duct element may contain fluids with temperatures that are higher than the upper temperature limit of a temperature sensitive device and/or structure within the turbo engine.

The cooling pipe for cooling the core of the turbo engine might for example contain fluids with temperatures suitable for cooling the turbo engine core but at the same time above the upper temperature limit of for example a HBVSB of the turbo engine.

In case the fluid duct element burst the engine needs to be at least partially protected against the risks the burst event at the fluid duct element bears for the turbo engine. The casing device should at least partially contain the fluid stemming from the burst fluid duct element and/or deflect it at least partially.

For the protection of the turbo engine the temperature sensitive device and/or structure (e.g. the HBVSB) can be prevented from overheating due to the casing device. The casing device dictates the locations of the release of the fluid leaking out of the burst fluid duct element. It also influences some characteristics of the fluid escaping the casing device. By influencing the resulting flow of the at least partially escaped fluid in the turbo engine it is possible to minimize the risk of overheating for a temperature sensitive device and/or structure.

For example the flow of fluid can at least partially be deflected away from the temperature sensitive device and/or structure. Due to the influence of the casing device on the resulting flow pattern, the escaping fluid might reach the temperature sensitive device and/or structure later and/or colder than it would have without a casing device. Because the fluid leaking out can also partially be contained within the casing device, the amount of escaping fluid reaching the temperature sensitive device and/or structure might be smaller than it would be without the casing device.

By containing the fluid from the burst fluid duct element at least partially it is possible to maintain a certain amount of flow through the fluid duct element. The at least partial continuation of the flow through the fluid duct element can prevent further failure risks of the turbo engine. If the fluid duct element is e.g. the cooling pipe for the turbo engine's core the at least partial continuation of the cooling flow after the burst of the cooling pipe can ensure that an overheating of the engine core does not occur or is at least postponed.

The casing device might also at least partially contain possible debris being produced by the burst event at the fluid duct element. The region surrounding the casing device can therefore be protected from the debris.

Generally it is possible that the casing device just postpones the effects of a burst event at the fluid duct element and/or weakens them. But this possible gain in time due to the postponement of the effects might be enough for at least one sensor to detect the burst event at the fluid duct element and steps might be taken to at least partially prevent failure of components before they happen.

In another variant of the invention the casing device comprises at least one opening being provided as fluid escaping means. The fluid escaping the burst fluid duct element can at least partially escape the casing device through the opening.

In a further embodiment the casing device comprises at least one deflection and/or shielding means. The deflection and/or shielding means can for example deflect a fluid escaping through the fluid escaping means and/or shield a certain region from the fluid escaping through the fluid escaping means.

It is for example possible that the fluid is deflected away from a region by the deflection and/or shielding means. It is also possible that the deflection and/or shielding means shield a certain region from the escaping fluid. The deflection and/or shielding means can also just guide a flow of fluid escaping the casing device.

Different kinds of embodiments are possible for the at least one deflection and/or shielding means. For example it can have a circular, ellipsoidal, rectangular or polygonal cross-section. It can be arranged so that it has a flat surface and is completely level. In other embodiments it might be formed to achieve a desired deflection and/or shielding effect. It could e.g. have several bends.

Deflection and/or shielding means comprising several parts are also possible embodiments. The deflection and/or shielding means might be arranged in a way to protrude outside and/or inside of other elements of the casing device.

The at least one deflection and/or shielding means might be arranged anywhere along the casing device. The location can depend on the desired deflection and/or shielding effect to be achieved.

A variant of the deflection and/or shielding means can be disc shaped with an opening at the center, having an inner diameter. The disc can have a circular cross-section with an inner diameter which is smaller than the outer diameter. This shape could also be described as a form of ring. The inner diameter might for example be of the same size as a casing section diameter. The disc can be arranged at a casing section on the outside or at one end without obstructing the flow of fluid inside the casing device.

In a further embodiment the casing device can comprise several casing sections being at least partially in fluid communication, wherein at least one fluid escaping means is provided at a transition point between at least two casing sections.

The casing sections can be connected to each other by some connection means. The casing sections might also have no structural connection. They are at least partially in fluid communication though.

Fluid communication of two casing sections means that a part of a fluid leaving a first casing section can at least partially flow into the second casing section which is in fluid communication with the first casing section. The point where the fluid at least partially flows from one casing section into another casing section is called transition point.

It is possible in some embodiments that the casing sections can have different cross-sections and still be in fluid communication. In an embodiment with e.g. tubular shaped casing sections the diameters of the casing sections might be different.

Fluid escaping means might for example be provided by a gap between two casing sections. The gap might allow a fluid inside the casing device to escape at least through one gap between two casing sections.

The gap between two casing sections might be variable in another embodiment. The variation of the gap size can lead to different escaping characteristics of the fluid escaping the casing device. A large gap can lead to more mass per minute escaping the casing device as well as possibly to a lower pressure inside the casing device. A smaller gap vice versa might lead to less mass per minute escaping the casing device as well as possibly a higher pressure inside the casing device.

In another embodiment the several casing sections comprise at least one deflection and/or shielding means at a transition point providing fluid escaping means. Deflection and/or shielding means can be arranged at each end of the casing sections that face each other at the transition points.

In an embodiment where the deflection and/or shielding means are disc shaped with a circular cross-section and an opening of an inner diameter being smaller than the outer diameter of the disc then such an embodiment can provide radial deflection and/or shielding means for the fluid escaping the casing device.

A further embodiment comprises a casing device with at least one flexible sleeve as a casing section. A rigid casing section might also be comprised by another variant.

A flexible sleeve can be very flexible and easy to install at least partially around the fluid duct element. It can also be self-expanding. In an embodiment with a self-expanding casing device a pressure build up inside the casing device might lead to the expansion of the sleeve.

The sleeve can expand to its full size and then stabilize itself. The pressure build up can come from a burst event at the fluid duct element being at least partially encased by the casing device.

In another embodiment the casing device is provided to at least partially protect the region surrounding the casing device from debris that might be produced by a burst event at the fluid duct element being at least partially encased by the casing device.

The casing device can be designed to be structurally stable enough to at least partially contain possible debris. The debris might be produced by the burst of the at least partially encased fluid duct element.

Another variation of the invention comprises the casing device which is provided to maintain at least partially the flow of fluid of a burst fluid duct element being at least partially encased by the casing device.

The casing device enables at least partially the continuation of the original flow inside the fluid duct element after the burst. The flow of fluid from one end to another end inside the fluid duct element can be maintained by the casing device.

There can for example be a pressure build up inside the casing device after the burst event at the fluid duct element. This pressure can force at least a part of the fluid trying to leak out of the fluid duct element to stay inside the fluid duct element. Hereby a part of the original flow can be maintained.

In another embodiment the casing device is provided to deflect the outflow of fluid leaking out of a burst fluid duct element being at least partially encased by the casing device in radial direction seen from the axis of the casing device.

In some embodiments the location of the at least one fluid escaping means might be adjustable. It could for example be adjusted depending on the desired flow characteristics of the fluid escaping through the fluid escaping means.

In other embodiments the direction of the flow of escaping fluid can be adjustable. The flow might for example be adjusted by adjusting the angle of some deflection and/or shielding means arranged in the region of a fluid escaping means. It might also be adjustable by changing the characteristics of the fluid escaping means.

Another embodiment is a turbo engine, in particular an aircraft turbo engine comprising at least one protection system as described herein.

BRIEF DESCRIPTION OF THE DRAWINGS

Exemplary embodiments of the invention are shown in the Figures:

FIG. 5A showing a sixth embodiment of a protection system with a casing device, comprising 4 casing sections.

FIG. 6 showing an eight embodiment of a protection system, integrated into a part of a turbo engine.

DETAILED DESCRIPTION

Figure 1:
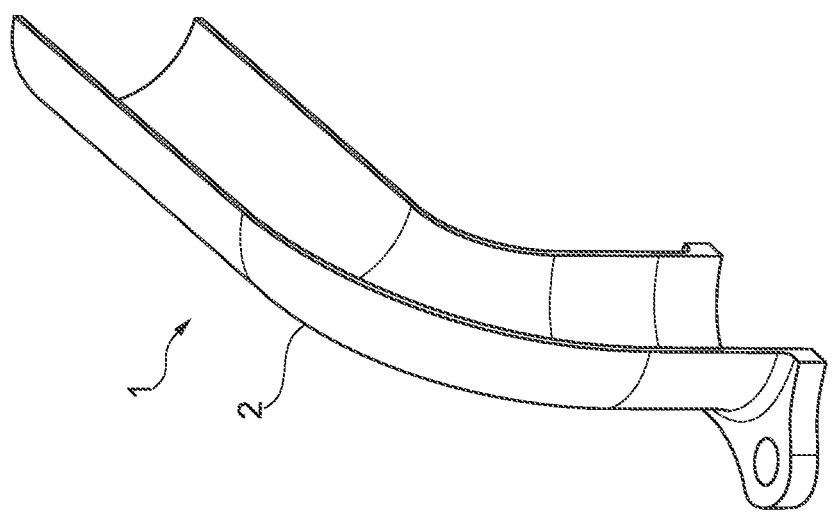
FIG. 1 showing a first embodiment of a protection system with a casing device comprising one casing section.

In FIG. 1 a first embodiment of a protection system with a casing device 1 is shown comprising one casing section 2. The casing device 1 has an inner cross-section of a half circle. At one end it can be attached to a base plate which allows the casing device 1 to be mounted on a suitable surface. The casing device 1 can partially enclose e.g. fluid duct elements 3 with a circular cross-section of a smaller diameter than the casing device 1 but with a similar shape. It is to understand that by shape of the fluid duct element 3 the run of the element with its bends and other characteristics is meant.

Such an embodiment of a casing device 1 could for example be used to protect a region on one side of a fluid duct element 3 (not shown in FIG. 1), in case of a burst event at the fluid duct element 3. The casing device 1 would provide at least some amount of protection to e.g. the region facing the casing device 1 before the fluid duct element 3.

Figure 2:
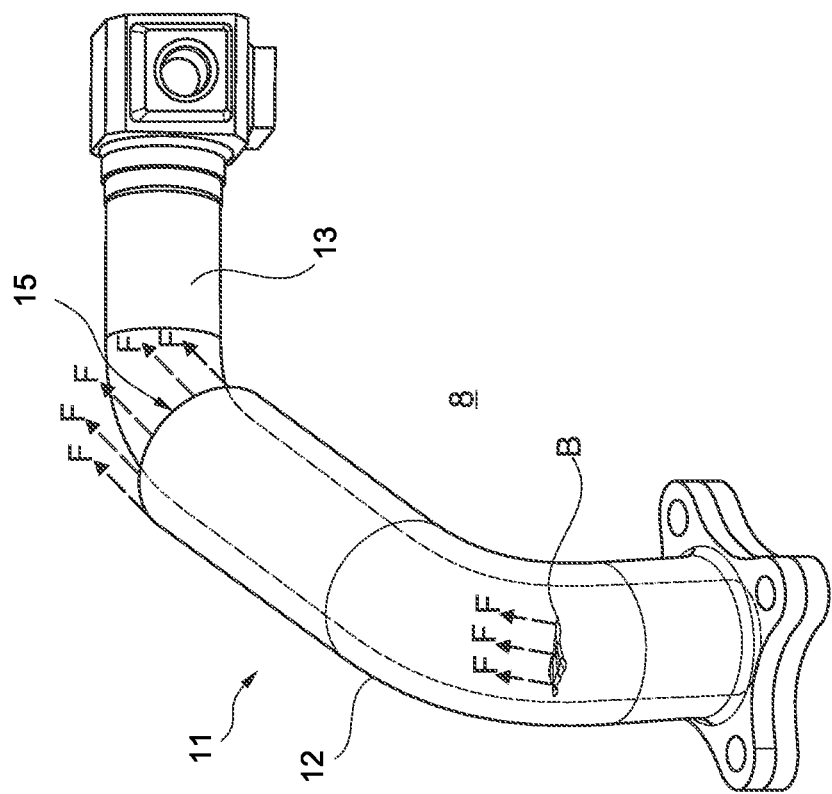
FIG. 2 showing a second embodiment of a protection system with a casing device comprising one casing section, partially encasing a fluid duct element.

In FIG. 2 a second embodiment of a protection system with a casing device 11, comprising one casing section 12 is shown, as well as a fluid duct element 13, being partially encased by the casing device 11. The fluid duct element 13 and the casing device 13 have both a circular cross-section along the main part of their bodies. They are of tubular shapes and the diameter of the fluid duct element 13 is smaller than the diameter of the casing device 11. Both have a similar shape in the region where the casing device 11 at least partially encases the fluid duct element 13.

The fluid duct element 13 is longer than the casing device 11. The casing device 11 starts to encase the fluid duct element 13 at one end of the fluid duct element and stops to encase it after a certain length. The tubular fluid duct element 13 is longer than the casing device 11.

The second end of the casing device 11, the end where it stops to encase the fluid duct element 13, is a cut-off of the tubular casing device 11. This cut-off can be an opening 15 which provides fluid escaping means 14 for a fluid F inside the casing device 11.

If the fluid duct element 13 bursts anywhere in the region where it is encased by the casing device 11, for example at a burst point B, then the fluid F leaking out of the fluid duct element 13 will first flow into the casing device 11. The casing device 11 provides protection to a region 8 surrounding the casing device 11 at least to some extend from the fluid F leaking out of the burst fluid duct element 13. Debris that might be produced by the burst can at least partially be contained by the casing device 11, as well as the fluid F leaking out of the fluid duct element 13.

The casing device 11 also maintains a certain amount of pressure in the burst fluid duct element 13, which is usually lower than the pressure inside the fluid duct element 13 before the burst event but in most cases still allows the original flow of fluid to continue in a weaker form.

The fluid F which enters the casing device 11 at the burst point B, flows through the casing device 11 until it can escape the casing device 11. In this embodiment the opening 15, the cut-off, provides the fluid escaping means 14 for the fluid F to escape. Therefore the fluid F leaking out of the burst fluid duct element 13 is released in a controlled manner into the region 8 surrounding the casing device 11.

The location of the controlled release of the fluid F into the surrounding region 8 depends on the location of the fluid escaping means 14, the opening 15 in this case. The properties of the escaping fluid F, e.g. mass of fluid per time, direction of release, pressure of release and others are determined by the shape of the opening 15. In this case it would depend on the size of the diameter of the opening 15 compared to the diameter of the fluid duct element 13.

Figure 3:
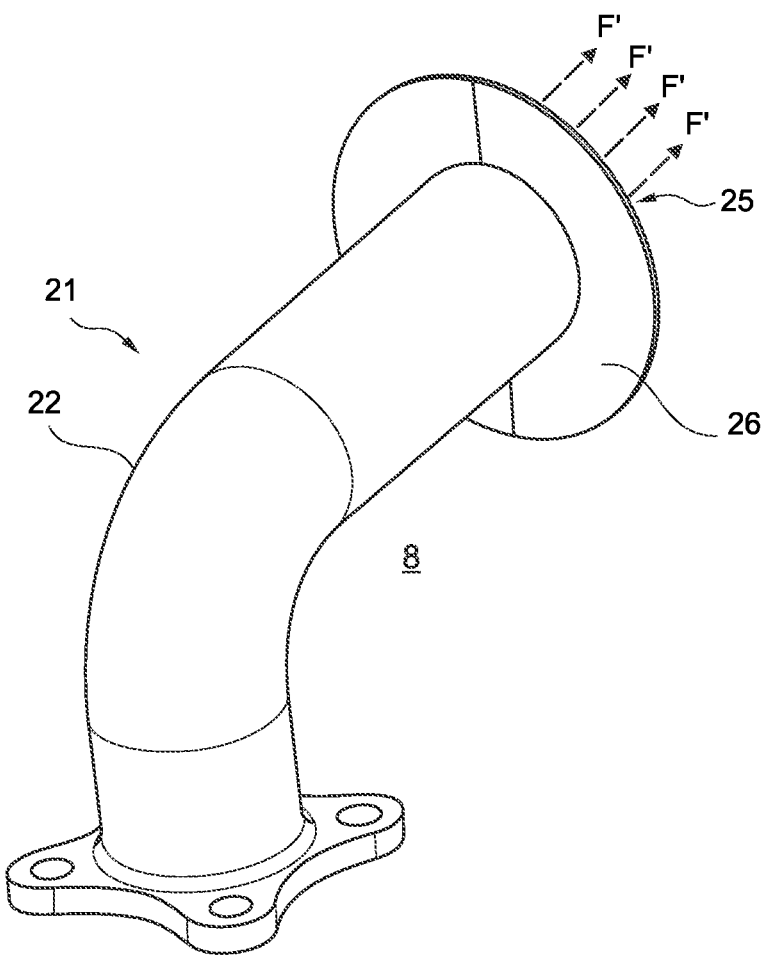
FIG. 3 showing a third embodiment of a protection system with a casing device comprising one casing section, as well as deflection and/or shielding means.

In FIG. 3 a third embodiment of a protection system is shown. It is a variation of the second embodiment, so that reference can be made to the above description. As in FIG. 2 the casing device 21 comprises one casing section 22 of a tubular shape and an opening 25 providing fluid escaping means. In addition to this the casing device 21 also comprises deflection and/or shielding means 26. The fluid duct element 23 is not shown in this figure for the sake of simplicity.

The deflection and/or shielding means 26 are of a disc shape with an opening in the center. They are arranged at one end of the casing device 21, namely in this case to the end comprising the opening 25 as fluid escaping means. The opening of the disc shaped deflection and/or shielding means 26 is of the same size as the opening 25 of the tubular shaped casing device 21, they have the same diameter.

The outer diameter of the disc shaped deflection and/or shielding means 26 is larger than the inner diameter. This provides deflection and/or shielding means 26 surrounding the fluid escaping means 24 being provided by the opening 25.

Therefore in this third embodiment can at least partially contain a fluid F' stemming from a burst fluid duct element which is at least partially encased by the casing device 21. As the casing device 21 shown in FIG. 2 the casing device 21 shown here can also provide protection to an region 8 surrounding the casing device 21 at least to some extend from the fluid F' leaking out of the burst fluid duct element as well as possible debris from the burst.

In addition to the features elaborated in connection with the embodiment of FIG. 2 the embodiment shown in FIG. 3 provides additional protection from a burst event at the fluid duct element. The deflection and/or shielding means 26 can for example deflect the fluid F escaping through the opening 25 providing the fluid escaping means. It can also e.g. shield a region from the fluid F' escaping the casing device 21.

This allows for a more controllable release of the fluid F' from inside the casing device 21. The fluid F' escaping through the fluid escaping means is potentially hazardous for certain parts in the region of the fluid duct element. It might for example be too hot for a temperature sensitive device and/or structure 60 (FIG. 6) within the turbo engine. The casing device 21 can at least partially contain the fluid F' as well as deflect the escaping fluid F' at least partially away from a region with a temperature sensitive device and/or structure 60. It might also shield the region from the escaping fluid F' to some extent.

Figure 4B:
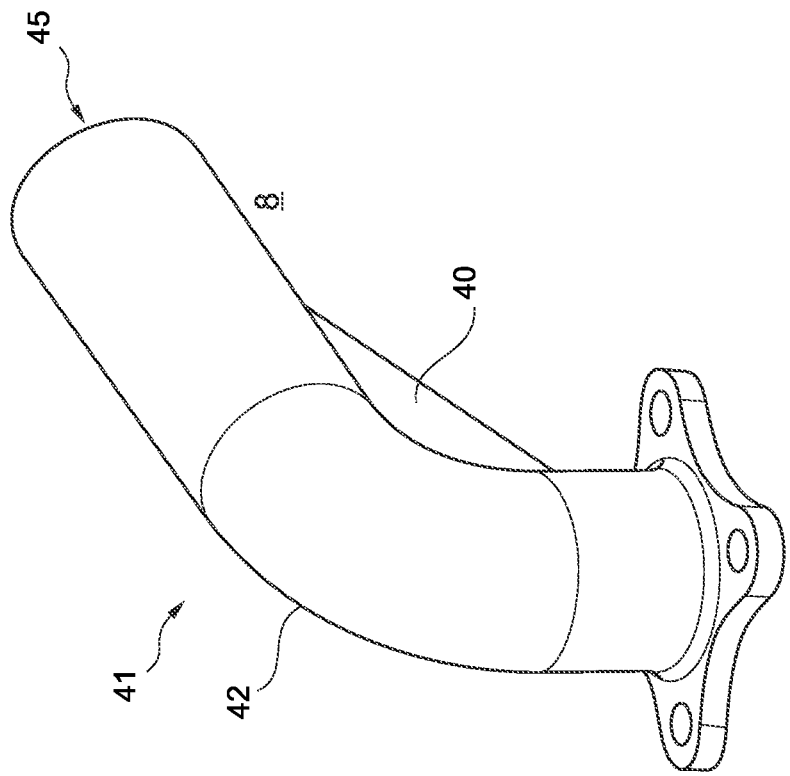
FIG. 4B showing a fifth embodiment of a protection system with a casing device comprising one casing section and stabilization means.
Figure 4A:
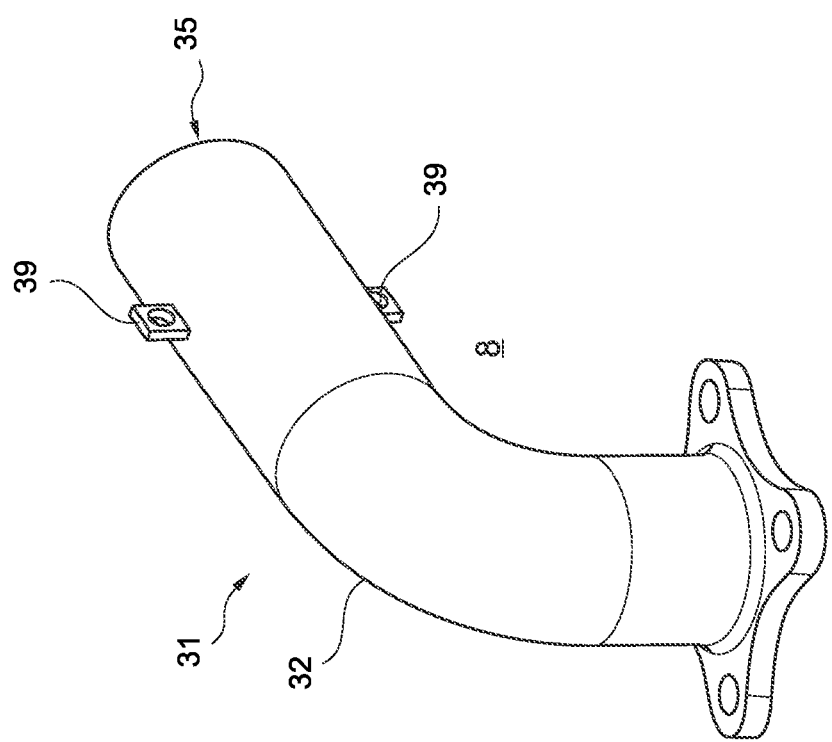
FIG. 4A showing a fourth embodiment of a protection system with a casing device comprising one casing section made out of two parts with fixture points.

In FIG. 4A a fourth embodiment of a protection system is shown. It is a variation of the second embodiment, so that reference can be made to the above description. As in FIG. 2 the casing device 31 comprises one casing section 32 of a tubular shape and an opening 35 providing fluid escaping means. In addition to this the casing device 31 also comprises two fixture points 39. The fluid duct element is not shown in this figure for the sake of simplicity.

In this embodiment the casing device 31 has two parts which are connected to each other by the fixture points 39. Each part is half of the casing device 31 with a half circle as their respective cross-sections.

This embodiment allows for easier arrangement around a tubular shaped fluid duct element. The two parts can be placed separately around the fluid duct element and the connected to each other by the two fixture points 39.

In FIG. 4B a fifth embodiment of a protection system is shown. It is a variation of the second embodiment, so that reference can be made to the above description. As in FIG. 2 the casing device 41 comprises one casing section 42 of a tubular shape and an opening 45 providing fluid escaping means. In addition to this the casing device 41 also comprises stabilization means 40. The fluid duct element is not shown in this figure for the sake of simplicity.

The stabilization means 40 stabilize the casing device 41, in particular along the bend. This stabilization can minimize the vibrations and movement of the casing device 41. It might prevent the casing device 41 from touching the encased fluid duct element during operation of the turbo engine.

In FIG. 5A a sixth embodiment of a protection system is shown. A casing device 51 is shown, said casing device 51 comprising four casing sections 52 of tubular shapes being in fluid communication with each other. Every casing section 52 is spaced some distance apart from the next casing section 52. Three transition points 57 are formed between two casing sections 52 each and three fluid escaping means 54 are provided at the three transition points 57. At every transition point 57 two ends of two different casing sections 52 face each other at least partially, these ends are each equipped with deflection and/or shielding means 56. From left to right the casing sections 52 can be numbered from one to four. In other embodiments a different number of casing sections 52 and/or transition points 57 is possible.

The first and the last casing section 52 are slightly bent. The second and third casing section 52 are straight. The deflection and/or shielding means 56 are of the same form as in FIG. 3, namely disc shaped with an opening in the center.

The opening of the disc shaped deflection and/or shielding means 56 is of the same size as the opening of the tubular shaped casing section 52, they have the same diameter. The outer diameter of the disc shaped deflection and/or shielding means 56 is larger than the inner diameter.

A fluid flowing inside the casing device 51 can at least partially flow from one casing section 52 to the next casing section 52. This means the casing sections 52 are in fluid communication. Therefore a fluid flowing inside the casing device 51 can at least partially flow from one end of the casing device 51 to the other end of the casing device 51. It can also at least partially be released into the surrounding region 8 of the casing device 51 by the fluid escaping means 54.

The casing device 51 of this embodiment can encase a fluid duct element 53 (FIG. 5B) at least partially, e.g. between two ends.

Figure 5B:
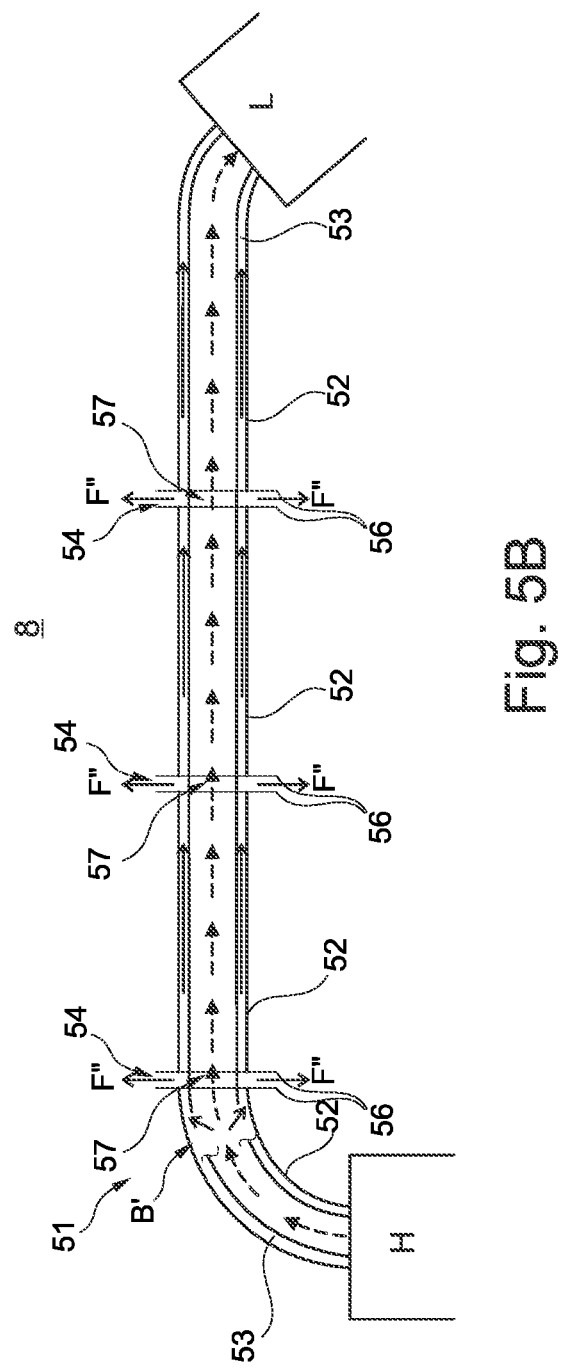
FIG. 5B showing a seventh embodiment of a protection system with the casing device already shown in FIG. 5A, but encasing a burst fluid duct element, and a symbolized flow pattern is shown.

More details on how this embodiment of a casing device 51 can work in case of a burst event at the fluid duct element 53 is explained in combination with FIG. 5B.

In FIG. 5B a seventh embodiment of a protection system is shown. It comprises the casing device 51 shown in FIG. 5A, so that reference can be made to the above description. As in FIG. 5A the casing device 51 comprises four casing sections 52 of tubular shapes being in fluid communication with each other. Every casing section 52 is spaced some distance apart from the next casing section 52. Three transition points 57 are formed between two casing sections 52 each and three fluid escaping means 54 are provided at the three transition points 57. At every transition point 57 two ends of two different casing sections 52 face each other at least partially, these ends are each equipped with deflection and/or shielding means 56 which are disc shaped as described in FIG. 5A. From left to right the casing sections 52 can be numbered from one to four. The casing device 51 encases at least partially a fluid duct element 53 with a similar shape as the casing device 51.

The casing device 51 and the fluid duct element 53 start at the same place and end at the same place. The fluid duct element 53 usually contains a fluid flowing from one end to the other end. This fluid might be hotter than the upper temperature limit of a temperature sensitive device and/or structure 60 within a turbo engine.

The fluid in the fluid duct element 53 usually flows from a high pressure zone H to a low pressure zone L. It might for example be a flow of cooling fluid for the engine core of a turbo engine. The fluid duct element 53 would be a cooling pipe 53 for the engine core in this case and be vital for the proper functioning of the engine. Cooling is relative in this case. The fluid might be suitable for cooling the engine core but still a lot hotter than the upper temperature limit of the temperature sensitive devices and/or structure 60.

Therefore a burst of a fluid duct element 53, e.g. the aforementioned cooling pipe 53 for the engine core, can carry a triple risk. The burst can produce debris, damaging elements in the region 8 surrounding of the fluid duct element 53, it can have leaking hot fluid F''' endangering temperature sensitive devices and/or structures 60 and the possible decrease and/or stoppage of fluid flow (e.g. cooling flow) might endanger parts of the turbo engine, needing the fluid flow (e.g. engine core). This is just a selection of possible risks there might be other risks not named here.

The casing device 51 can protect the turbo engine at least partially against at least some of the possible risks.

As shown in FIG. 5B a burst of the fluid duct element 53 happened in the region of the first casing section 52, right after the bend. The flow of fluid inside the fluid duct element 53 is symbolized by short dashed arrows. It starts at the High pressure zone H and when it gets to a burst point B' a part of the fluid F''' flows into the fluid duct element 53 and enters the casing device 51. The fluid F''' which enters the casing device 51 is symbolized by solid arrows.

The fluid F''' which enters the casing device 51 can at least partially escape the casing device 51 at the fluid escaping means 54 which are provided at the transition points 57 between casing sections 52. Due to the deflection and/or shielding means 56 in the region of the fluid escaping means 54 is the at least partially escaping fluid F''' released in a radial direction away from the axis of the casing device 51.

Because the fluid F''' can partially be contained by the casing device 51 the pressure inside the casing device 51 builds up to a certain level. This pressure build up can contain a part of the fluid F''' trying to flow out of the fluid duct element 53 inside the fluid duct element. This can maintain the original flow in a slightly weaker form. The continuation of the original flow is symbolized by the short dashed arrows after the burst point B'.

Even though the continuation flow is weaker than the original flow it might still be enough to prevent a catastrophic failure of a component needing the flow. For example the cooling of the engine core can be restored to a satisfactory level to prevent a failure of it.

The fluid F" escaping the casing device 51 is released in a more controlled way compared to a burst event at the fluid duct element 53 without casing device 51. For example is the location of the release predefined by the location of the fluid escaping means 54. The angle of release and the direction of release are predefined by the deflection and/or shielding means 56. The deflection and/or shielding means 56 can give additional protection by deflecting the escaping fluid F" away from a certain region and/or shielding a certain region.

The fluid F" can also partially be contained in the casing device 1. Therefore only a part of the fluid F" escapes into the region 8 surrounding the casing device 51 compared to the situation without the casing device 51.

The casing device 51 provides therefore a certain amount of protection for a temperature sensitive device and/or structure 60 from the fluid F" leaking out of the burst fluid duct element 53.

Possible debris being produced by a burst event at the fluid duct element 53 might be contained in the casing device 51, giving protection to elements surrounding the casing device 51.

In FIG. 6 an eight embodiment of a protection system is shown. It comprises a casing device 61 with four casing sections 62 of tubular shapes being in fluid communication with each other. The casing device 61 is integrated into a part of a turbo engine. The casing device 61 encases at least partially a fluid duct element, namely a cooling pipe of the engine core, which has a similar shape compared to the casing device 61. Every casing section 62 of the casing device 61 is spaced some distance apart from the next casing section 62. Three transition points 67 are formed between two casing sections 62 each and three fluid escaping means 64 are provided at the three transition points 67. At every transition point 67 two ends of two different casing sections 62 face each other at least partially, these ends are each equipped with deflection and/or shielding means 66. From left to right the casing sections 62 can be numbered from one to four.

The part of the turbo engine which is shown can be divided into two zone along the bold dashed line. The first zone lies to the left of the bold dashed line and the second zone lies to the right of the bold dashed line. The cooling pipe and the casing device 61 are arranged on the right side of the bold dashed line in the second zone. A temperature sensitive device and/or structure 60 is arranged in the first zone on the left side of the bold dashed line. It is for example a so called Handling Bleed Valve Solenoid Block (HBVSB).

The flow of fluid through the fluid duct element starts at the high pressure zone H' and flows toward the low pressure zone L'. In case of a burst of the fluid duct element the fluid F'" leaking out of the fluid duct element can at least be partially contained in the casing device 61 and partially be released into the region 8 surrounding the casing device 61 in a more controlled manner than without a casing device 61. The casing device 61 can also maintain a certain amount of the original flow through the fluid duct element in a burst event at the fluid duct element.

The continuation of a cooling flow, if the fluid duct element is a cooling pipe for example, is critical for the continued operation of the turbo engine.

As described in FIG. 5A the fluid escaping means 64 with the deflection and/or shielding means 66 can release the escaping fluid F'" in a radial direction from the axis of the casing device 61. This is symbolized by little short arrows. The deflection and/or shielding means 66 are again disc shaped with an opening at their center and arranged at the casing sections 62.

The opening of the disc shaped deflection and/or shielding means 66 is of the same size as the opening of the tubular shaped casing section 62, they have the same diameter. The outer diameter of the disc shaped deflection and/or shielding means 66 is larger than the inner diameter.

Because the temperature sensitive device and/or structure 60, the HBVSB for example, is arranged in the region of the fluid duct element, the cooling pipe in this case, it is important to protect the HBVSB 60 from overheating.

The temperature of the fluid in the cooling pipe usually lies above the upper temperature limit of the HBVSB 60. Temperatures that are higher than the upper temperature limit of the HBVSB 60 are hot temperatures. Temperatures that are lower than the upper temperature limit of the HBVSB 60 are cold temperatures. The casing device 61 can prevent the HBVSB 60 from overheating in case of a burst cooling pipe event.

The fluid F'" originating at the burst point has a hot temperature. The burst point can be located fairly close to the HBVSB 60, namely shortly after the connection point of the cooling pipe to the high pressure zone H'. This location is very close to the bold dashed line.

Without the casing device 61 the hot fluid F'" would enter the second zone uncontrolled, and quickly reach the first zone with barely any temperature reduction. In the first zone it would reach the HBVSB 60 with a temperature above the limit of the HBVSB 60, heating it up.

Because of the high temperature of the fluid F'" the HBVSB 60 would be heated up above its upper temperature limit. This can lead to catastrophic failure of the device and endanger the operation of the turbo engine.

Also the cooling flow of the cooling pipe would be massively interrupted by the burst in the cooling pipe without the casing device 61 present. This leads to additional risks for the operation of the turbo engine.

With the casing device 61 surrounding the fluid duct element the situation can be different. In case of a burst cooling pipe event, the highest temperatures are reached within the casing device 61 and close to the fluid escaping means 64, which are the radial slots with deflection and/or shielding means 66. Due to the locations of the fluid escaping means 64, the fluid F'" of the cooling pipe can escape the casing device 61 at predefined spots. The spots are chosen in a manner to minimize the risk for the HBVSB 60. So for example the first possibility for the fluid F'" to escape the casing device 61 is further away from the HBVSB 60 as the burst point.

Also due to the disc shaped deflection and/or shielding means 66, as described in FIG. 6, the fluid F'" is released in a radial direction away from the axis of the casing device 61.

The fluid F'" originating at the burst point has a hot temperature, it escapes at least partially the casing device 61 at the fluid escaping means 64. From there it starts to swirl around inside the turbo engine until it reaches the HBVSB 60.

Due to the controlled release and the at least partial escape of the cooling fluid F'" through the fluid escaping means 64, the fluid F''' reaches the HBVSB with a temperature below the upper temperature limit of the HBVSB. The temperature is usually still higher than the original temperature of the device and therefore will heat up the HBVSB 60 but not to an extent where the failure of the HBVSB 60 might be a risk. The HBVSB 60 is fully functional up to its upper temperature limit. The operation of the engine does not have to be at risk.

Also the cooling flow of the cooling pipe is not massively interrupted by the burst in the cooling pipe. The casing device 61 contains at least partially the fluid F''' leaking out of the burst fluid duct element 63. Therefore pressure builds up inside the casing device 61 and this pressure build up allows the casing device 61 to maintain at least partially the original flow of fluid F''' in the cooling pipe. The continuation of the flow can help to prevent a failure of the turbo engine due to a too small cooling flow.

On the other hand the pressure does not reach a level that might endanger the casing device 61 to burst itself. The fluid escaping means 64 provide enough release to prevent such a risk.

The embodiments shown above relate to turbo engines, in particular aircraft turbo engines. Other embodiments—not shown—relate to other turbo engines such as e.g. gas turbines. Protection systems with a casing device can also be used for protection of certain regions within those types of engines.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context. Various features of the various embodiments disclosed herein can be combined in different combinations to create new embodiments within the scope of the present disclosure. Any ranges given herein include any and all specific values within the range and any and all ranges within the given range.

REFERENCE LIST

1/11/21/31/41/51/61 casing device
2/12/22/32/42/52/62 casing section
13/53 fluid duct element, e.g. cooling pipe
54/64 fluid escaping means
15/25/35/45 opening
26/56/66 deflection and/or shielding means
57/67 transition point
8 surrounding region
39 Fixture point
40 Stabilization means
60 temperature sensitive device and/or structure, e.g. HBVSB
F/F'/F''/F''' fluid, e.g. cooling fluid
H/H' high pressure zone
L/L' low pressure zone
B/B' burst point

The invention claimed is:

1. A turbo engine, comprising:
 a fluid duct element connecting between a first area of the turbo engine and a second area of the turbo engine for flowing a fluid between the first area and the second area,
 a protection system comprising:
  a casing device comprising a plurality of casing sections, the plurality of casing sections being at least partially in fluid communication with one another and encasing the fluid duct element along an entire length of the fluid duct element,
  the casing device further comprising a fluid escaping device,
  wherein the casing device is configured to at least one chosen from at least partially contain and deflect a flow of the fluid from the fluid duct element to prevent damage to the aircraft turbo engine in event of a bursting of the fluid duct element;
  wherein the fluid escaping device is positioned at a transition point between two of the plurality of casing sections.

2. The turbo engine according to claim 1, wherein the fluid escaping device includes an opening in the casing device.

3. The turbo engine according to claim 1, wherein the casing device further includes a deflector for deflecting the flow of the fluid from the fluid duct element.

4. The turbo engine according to claim 3, wherein the deflector includes a disc shaped element.

5. The turbo engine according to claim 1, wherein a spatial distance between at least two of the plurality of casing sections is adjustable.

6. The turbo engine according to claim 1, wherein the casing device includes a deflector for deflecting the flow of the fluid from the fluid duct element, the deflector positioned at the fluid escaping device.

7. The turbo engine according to claim 1, wherein at least one of the plurality of casing sections includes a flexible sleeve.

8. The turbo engine according to claim 1, wherein the casing device maintains at least partially the flow of fluid in the fluid duct element.

9. The turbo engine according to claim 1, wherein the fluid escaping device deflects the flow of fluid from the fluid duct element in a radial direction seen from an axis of the casing device.

10. The turbo engine according to claim 1, wherein the fluid duct element comprises a cooling pipe.

11. The turbo engine according to claim 1, wherein a location of the fluid escaping device is adjustable.

12. The turbo engine according to claim 1, wherein a direction of a flow of escaping fluid is adjustable.

13. The turbo engine according to claim 1, wherein at least one of the plurality of casing sections is rigid.

* * * * *